(12) United States Patent
Manakkal et al.

(10) Patent No.: US 6,665,629 B2
(45) Date of Patent: Dec. 16, 2003

(54) LOGIC FOR OUTSIDE TEMPERATURE DISPLAY

(75) Inventors: Raj Manakkal, Marysville, OH (US); Hirohide Suda, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 151 days.

(21) Appl. No.: 10/024,867

(22) Filed: Dec. 19, 2001

(65) Prior Publication Data

US 2003/0115012 A1 Jun. 19, 2003

(51) Int. Cl.$^7$ .............................................. G06F 15/00
(52) U.S. Cl. ...................................................... 702/130
(58) Field of Search ........................... 702/3, 130, 133; 374/141, 142, 163, 189; 340/901, 905; 701/1, 36

(56) References Cited

U.S. PATENT DOCUMENTS

| | | | |
|---|---|---|---|
| 4,770,543 A | * | 9/1988 | Burghoff et al. ............ 374/142 |
| 5,416,728 A | | 5/1995 | Rudzewicz et al. |
| 5,737,243 A | | 4/1998 | Wallrafen |
| 5,895,117 A | * | 4/1999 | Wuertenberger ............ 374/142 |
| 6,055,817 A | | 5/2000 | Wieszt |
| 6,088,661 A | | 7/2000 | Poublon |

FOREIGN PATENT DOCUMENTS

JP 02000247132 A * 9/2000

* cited by examiner

Primary Examiner—John Barlow
Assistant Examiner—Stephen J. Cherry
(74) Attorney, Agent, or Firm—Rankin, Hill, Porter & Clark LLP; Christen Millard

(57) ABSTRACT

A method for controlling an automobile exterior temperature display during a first period of time following starting the automobile includes comparing an ambient temperature to a display temperature and comparing a speed of the automobile to a threshold speed. If the speed is above the threshold speed and the sensed ambient temperature is more than a predetermined amount above the displayed temperature, the displayed temperature is adjusted at a first rate. The comparisons are continued for a predetermined period of time and, following the predetermined period of time, the displayed temperature is permitted to increase at a second rate. The second rate of increase is slower than the first rate of increase.

6 Claims, 1 Drawing Sheet

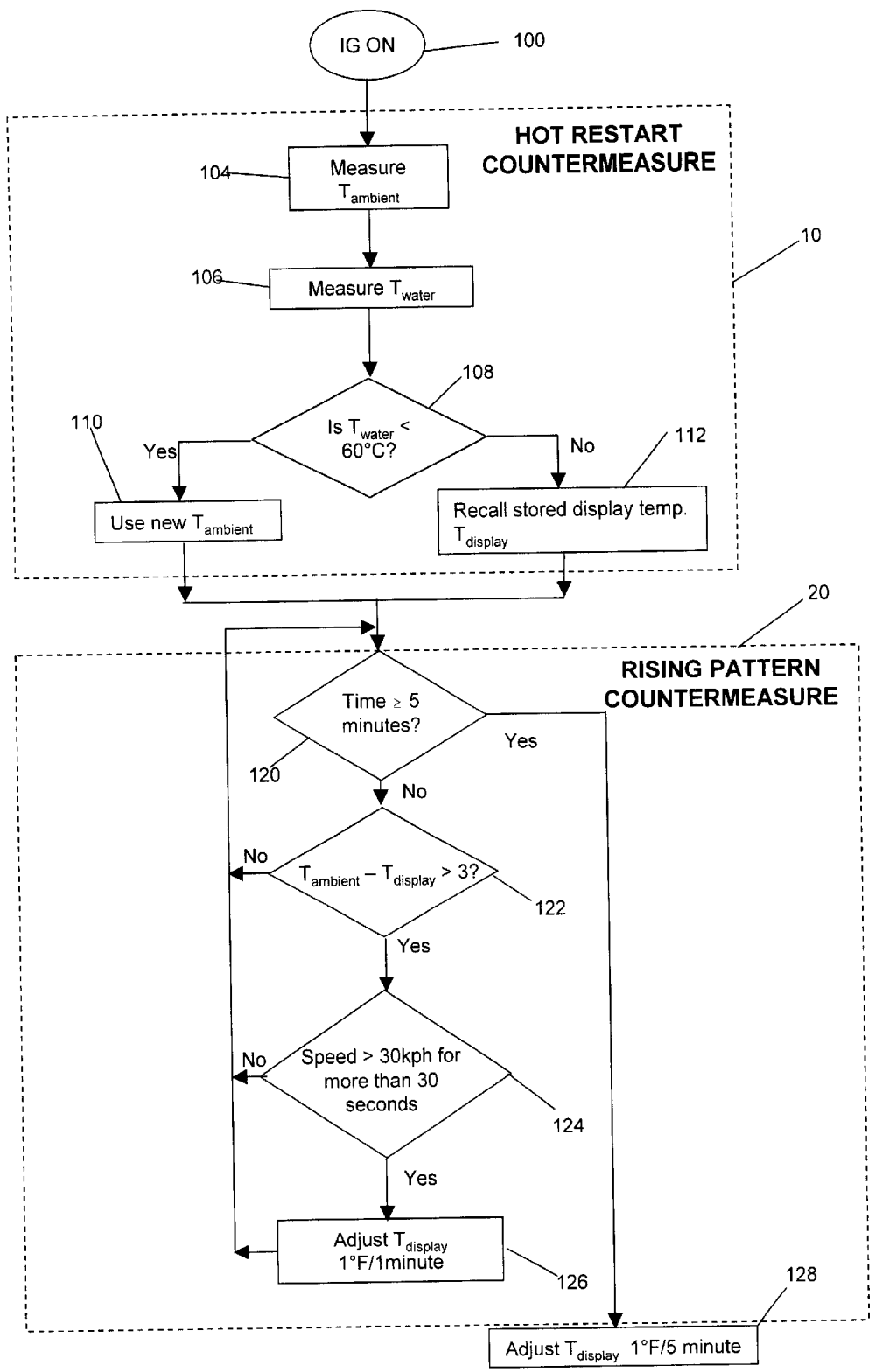

LOGIC FOR OUTSIDE TEMPERATURE DISPLAY

BACKGROUND OF THE INVENTION

1. Field of the Invention

The present invention is directed toward automobile exterior temperature displays and, more particularly, toward algorithms for controlling automobile external temperature display systems.

2. Description of Related Art

Displays for showing temperatures external to an automobile are known in the art and taught by U.S. Pat. Nos. 5,737,243; 5,895,117; 5,416,728; 6,088,661; and 6,055,817. These references show various features of automobile temperature displays and should be considered informative of the general state of the art.

It has been found that the methods and algorithms known in the art suffer from several disadvantages that are apparent during certain common operating conditions. For example, problems and inaccuracies exist when the automobile is operated after being parked for a period of time in an environment that is cooler than the surrounding ambient conditions. Such a parking environment may be an underground parking garage when the ambient is a hot sunny day.

When the vehicle exits the garage, the sensed ambient temperature increases rapidly. At present, the conventional algorithm permits the temperature displayed to increase by one degree per minute (1°/min.). However, since the engine quickly becomes hot even on short drives, the temperature displayed tends to overshoot the actual ambient temperature, and the sensed and displayed temperature is eventually higher than the actual ambient temperature.

Accordingly, there exists a need in the art for an algorithm or control scheme to prevent the displayed temperature from rising too quickly in such situations.

SUMMARY OF THE INVENTION

The present invention is directed toward a method and system for removing or avoiding the problems in the art. More specifically, the present invention is directed toward a method and system that is adapted to prevent or minimize incorrect adjustment of the temperature display in response to locally elevated temperatures and disparities between sensed ambient and displayed temperatures.

In accordance with the present invention, a method for controlling an automobile exterior temperature display is provided. The method includes the steps of comparing a sensed ambient temperature to a displayed temperature and comparing a sensed automobile speed to a threshold speed. If the sensed speed is above the threshold speed and the sensed ambient temperature is more than a predetermined amount above the displayed temperature, the displayed temperature is adjusted at a first rate.

In further accordance with the present invention, the speed and temperature comparisons are continued for a predetermined period of time and, thereafter, the displayed temperature is permitted to increase at a second rate. The second rate is slower than the first rate.

In further accordance with the present invention, the step of comparing the speed of the automobile with a threshold speed further requires that the speed be maintained over the threshold speed for a predetermined period of time.

BRIEF DESCRIPTION OF THE DRAWING

These and further features of the invention will be apparent with reference to the following description and drawing, wherein the sole FIGURE is a flow chart showing method steps according to the control algorithm of the present invention.

DETAILED DESCRIPTION OF THE PREFERRED EMBODIMENT

Initially, it is noted that the following description of the algorithm or method of operation of the temperature display system is one sequence of operations in a process that begins each time the automobile is started and concludes each time the automobile is turned off. As such, it is noted that the temperature display includes memory that is operable to retain previously displayed values ($T_{display}$) for future use, if necessary.

With reference to the drawing FIGURE, an automobile exterior temperature display algorithm incorporating the present invention is schematically illustrated. The illustrated algorithm consists essentially of two blocks: a hot restart countermeasure block (10) and a rising temperature pattern countermeasure block (20). The hot restart countermeasure block (10) is known in the art and is employed to determine the temperature to display upon starting the automobile. Generally, and as will be described more hereinafter, the sensed ambient temperature is displayed if the sensed coolant temperature is below a predetermined level and the previously displayed temperature is used as the displayed temperature if the sensed coolant temperature is above the predetermined level. Insofar as there are numerous blocks that may be successfully substituted for the hot restart countermeasure block (10), it is submitted that the present invention is not to be limited thereto. However, as will be apparent from the following discussion, it is important for operation of the rising pattern countermeasure block (20) for input display and ambient temperatures to be supplied thereto. Therefore, although the present invention is not limited to the hot restart countermeasure block (10), an algorithm of this type is necessary for the present invention.

With that being said, when the ignition is turned on (step 100), the hot restart countermeasure block begins and an ambient temperature is measured (step 104). The ambient temperature ($T_{ambient}$) is measured using the automobile-mounted temperature sensor, conventionally located in the front bumper of the automobile. The engine coolant temperature ($T_{water}$) is measured (step 106), and the temperature of the engine coolant is compared with a setpoint temperature (step 108). In this case a preferred setpoint temperature is 60° C., although it is considered apparent that relatively higher or lower setpoint temperatures may be appropriate in different installations.

If the sensed coolant temperature is below the setpoint temperature, it is determined that this is not a hot-restart situation, and the measured ambient temperature ($T_{ambient}$) is used as the displayed ambient temperature (step 110). On the other hand, if the sensed coolant temperature is above the setpoint temperature, it is a hot-restart situation, and the stored display temperature ($T_{display}$) is recalled from memory and used as the displayed ambient temperature (step 112). As such, the hot restart countermeasure block 10 prevents elevated sensed ambient temperatures, as would occur when the engine is hot (indicated by high coolant temperature), from interfering with display of an accurate temperature. In such case, the stored, previously displayed temperature is used as the display temperature, and is further adjusted, if necessary, in the rising pattern countermeasure block (20) described hereinafter.

As will be apparent from the following discussion, the rising pattern countermeasure block (20) is designed and adapted to accommodate situations wherein the ambient temperature is higher than the display temperature. In this regard it is important to understand that while two temperatures ($T_{ambient}$ and $T_{display}$) are initially provided to the rising pattern countermeasure block (20), the displayed temperature is relatively static and is controlled by the algorithm to change relatively slowly, if at all, during the initial period of operation following ignition (step 100). For example, assuming various conditions, discussed at length hereinafter, are met, the displayed temperature is only permitted to change one degree per minute (1°/min) during the first five minutes of operation (i.e., during the period of operation of the rising pattern countermeasure block). However, if the sensed ambient temperature ($T_{ambient}$) is uncontrolled, and may change much more quickly. Accordingly, even in situations wherein the displayed and ambient temperatures are initially identical, they can quickly move away from each other. This may happen when the automobile has been parked in a cool location (shade, underground garage, etc.) such that the initial sensed ambient temperature and display temperature is suppressed relative to the true ambient temperature. Thereafter, when the automobile is driven out into the middle of a hot summer day, the sensed ambient temperature will rapidly increase to correspond with the true ambient temperature.

In any event, the rising pattern countermeasure block is active for a predetermined time period after the activation of the ignition (step 100). In one preferred embodiment, the predetermined time period is five minutes. Accordingly, an initial step in the rising pattern countermeasure block is to check to see if the predetermined time period has passed (step 120).

The sensed ambient temperature is compared with the display temperature to determine if the ambient temperature is within a predetermined temperature band (step 122). If the sensed ambient temperature is not a predetermined amount greater than the displayed temperature, then the system makes no changes to the display and or ambient temperature adjustments. In one preferred embodiment, the predetermined amount is three degrees Fahrenheit (3° F.). However, it is noted that the predetermined amount will be selectable or tuned for each particular automobile in response to individual characteristics of the automobile. This setting may also be customizable by a dealer. As illustrated, the algorithm returns to check whether the predetermined time period has passed (step 120), and continues to compare the sensed ambient temperature to the displayed temperature.

If the ambient temperature is greater than the displayed temperature by an amount greater than the predetermined amount (step 122), then the system checks to see if the automobile is traveling at a predetermined rate of speed for a predetermined time period (step 124). In a preferred embodiment, the predetermined rate of speed is thirty kilometers per hour (30 kph) and the predetermined time period is thirty seconds (30 sec.). For example, if the automobile speed falls below the predetermined speed, then the timer for the predetermined time period resets and begins counting again when the predetermined speed is again measured. When the predetermined speed and time period conditions are met, the display temperature pattern is switched to increase at one degree per minute (1°/min) (step 126). While this rate of displayed temperature increase is preferred, it is also contemplated that a relatively faster or slower rate of displayed temperature change may be used with equal functionality.

This period of relatively rapid temperature display adjustment lasts as long as the rising pattern countermeasure is active (i.e., for the first five minutes following ignition (step 100)), the difference between ambient temperature and display temperature is greater than the predetermined amount (i.e., step 122), and the automobile speed is above the predetermined threshold (step 124). When any of these conditions changes, the display temperature is maintained constant. Moreover, this period ends, as does the active period of the rising pattern countermeasure block, at the end of the five-minute period.

Following the rising pattern countermeasure block (20), the displayed temperature is able to change up to one degree every five minutes (step 128). This relatively slower rate of change is preferred to force the displayed temperature to slowly increase, and thereby prevent inaccurate sensed ambient temperatures from affecting the displayed temperature. Typically, on short drives the displayed temperature will not be affected by heat build-up. Also, on long drives, presuming that the automobile is operated at higher speeds, temperature build up is not a concern. Accordingly, the relatively rapid initial period of displayed temperature change permits the display to approximate the actual ambient temperature, while the relatively slower subsequent displayed temperature change helps to prevent temperature over-shoot.

While the invention has been discussed herein with particularity, it is submitted that the invention is not to be limited thereto, but rather is capable of numerous modifications and substitutions without departing from the scope and spirit of the present invention. Rather, the invention is only to be defined by the claims appended hereto.

What is claimed is:

1. A method for controlling an automobile exterior temperature display, comprising the steps of:

sensing an ambient temperature;

determining whether use the sensed ambient temperature or a stored temperature as the displayed temperature;

the improvement comprising:
   a) comparing said sensed ambient temperature to said displayed temperature and,
   b) comparing a speed of said automobile to a threshold speed and, if said speed is above said threshold speed and said sensed ambient temperature is more than a predetermined amount above said displayed temperature, adjusting said displayed temperature at a first rate;

continuing the comparisons of steps a) and b) for a predetermined period of time; and, following said predetermined period of time, permitting said displayed temperature to increase at a second rate, said second rate being slower than said first rate.

2. The method of claim 1, wherein said speed comparing step includes the further step of:

said automobile being maintained over said threshold speed for a predetermined period of time.

3. The method of claim 2, wherein said first rate is several times the second rate.

4. A method for controlling an automobile exterior temperature display, comprising the steps of:
   a) comparing a sensed ambient temperature to a displayed temperature and,
   b) comparing a sensed automobile speed to a threshold speed and, if said sensed speed is above said threshold speed and said sensed ambient temperature is more than a predetermined amount above said displayed temperature, permitting said displayed temperature to be adjusted at a first rate;

continuing the comparisons of steps a) and b) for a predetermined period of time; and, following said predetermined period of time, permitting said displayed temperature to increase at a second rate, said second rate being slower than said first rate.

5. The method of claim 4, wherein said speed comparing step includes the further step of:

said automobile being maintained over said threshold speed for a predetermined period of time.

6. The method of claim 5, wherein said first rate is several times the second rate.

* * * * *

UNITED STATES PATENT AND TRADEMARK OFFICE
CERTIFICATE OF CORRECTION

PATENT NO. : 6,665,629 B2
DATED : December 16, 2003
INVENTOR(S) : Manakkal et al.

It is certified that error appears in the above-identified patent and that said Letters Patent is hereby corrected as shown below:

Column 4,
Line 34, delete "automobile".
Line 35, after "display", insert -- of an automobile --.
Line 38, after "whether", insert -- to --.

Signed and Sealed this

Thirteenth Day of April, 2004

JON W. DUDAS
*Acting Director of the United States Patent and Trademark Office*